T. N. RUSSELL.

RAILWAY CAR.

APPLICATION FILED APR. 8, 1916.

Reissued Apr. 15, 1919. 14,635.

Witnesses:
R. Burkhardt.
C. H. Roessner.

Inventor:
Homer N. Russell
By
Paul Carpenter, Atty.

UNITED STATES PATENT OFFICE.

THOMAS N. RUSSELL, OF CHICAGO, ILLINOIS, ASSIGNOR TO CHICAGO-CLEVELAND CAR ROOFING COMPANY, OF CHICAGO, ILLINOIS, A CORPORATION OF ILLINOIS.

RAILWAY-CAR.

14,635. Specification of Reissued Letters Patent. Reissued Apr. 15, 1919.

Original No. 1,171,663, dated February 15, 1916, Serial No. 875,435, filed December 4, 1914. Application for reissue filed April 8, 1916. Serial No. 89,996.

*To all whom it may concern:*

Be it known that I, THOMAS NATHAN RUSSELL, a citizen of the United States, and a resident of Chicago, in the county of Cook and State of Illinois, have invented certain new and useful Improvements in Railway-Cars, of which the following is a specification, reference being had to the accompanying drawings.

This invention relates to railway cars, and it has for one of its objects the provision of reinforcing and strengthening members adapted to be applied to a car for insuring proper rigidity of the end wall of the car. As is well known in the railway car art, upon the sudden starting or stopping of a loaded car, enormous stresses are brought to bear upon the ends of the car and it is essential that the end walls be very strongly constructed or reinforced if the car is to be maintained for any considerable time in first-class condition.

This is particularly true of wooden cars the ends of which are liable to break under the impact of the contents of the car against the car end when the car is suddenly started or stopped.

The principal objects of my present invention are the provision of means for strengthening old cars; the provision of improved means for reinforcing cars having frames constructed principally of wood; the provision of improved means for reinforcing car ends adjacent the end posts; and generally the provision of reinforcing means adapted to be applied to a car of the ordinary well-known construction whereby, without reconstructing the car, proper protection may be secured against undue straining and battering of the car under normal conditions.

It is another object of my invention to improve cars in sundry details hereinafter pointed out.

The means by which I have accomplished these objects are illustrated in the accompanying drawings and are hereinafter specifically described.

That which I believe to be new is set forth in the claims.

In the drawings—

Figure 1:
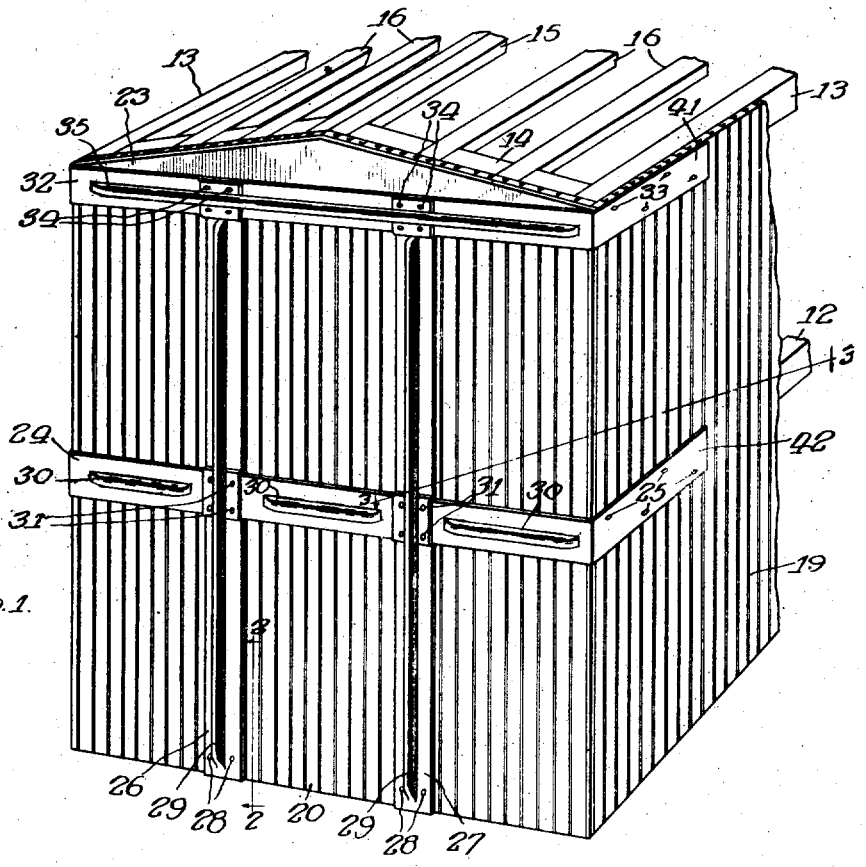
Figure 1 is a perspective view of one end of the body of a car of ordinary wood construction, with the roofing sheets removed therefrom.
Figure 2:
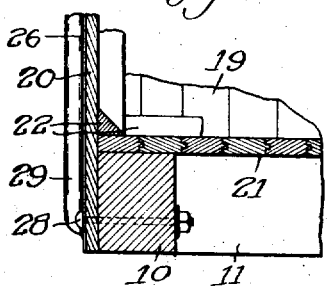
Fig. 2 is an enlarged detail, being substantially a section taken on line 2—2 of Fig. 1.

Referring to the several figures of the drawings, in which corresponding parts are indicated by the same reference characters,—10 indicates the end sill, 11 the side sill, 12 the belt rail, 13 the side plate, 14 the end plate, 15 the ridgepole, and 16 the purlins of a car of ordinary wood construction. As will be readily understood, the framework of the car comprising the parts named is securely braced in the ordinary manner so as to provide a maximum of rigidity between the upper frame comprising the side plates 13 and the end plates 14 and the lower frame comprising the side sills 11 and end sills 10,—corner posts 17 and end posts 18 being used in the usual manner for this purpose. Inasmuch as this construction is well known in the art, it is not believed to be necessary to further describe it herein.

The car is provided on its sides with vertically-extending side sheathing 19 and at its ends with vertically-extending end sheathing 20. A deck 21 is provided by the use of laterally-extending flooring boards extending between the side sills 11 and suitably supported intermediately in any appropriate manner. Grain-strips 22, of any suitable type, are used at the juncture between the side sheathing and the deck 21. An end fascia 23 is provided covering the upper ends of the end sheathing boards 20.

Coming now to my improved strengthening means, 26 and 27 indicate strengthening strips or vertical reinforcing members preferably formed of pressed steel arranged opposite the end posts 18. These vertical reinforcing strips 26 and 27 are made of greater width than the end posts and so provide support for the sheathing 20 on each side of the end posts 18. Further each strip 26 and 27 is provided with a strengthening rib or corrugation 29 of less width than the end posts so that the corners 40 of each strip afford support for the end posts, as shown more particularly in Fig. 3. The lower ends of these strips 26 and 27 are secured to the end sill 10 by means of the bolts 28. At their upper ends the strips 26, 27 are offset to fit snugly against the fascia 23 and the upper ends of the ribs or corrugations 29 are faded into the offset ends of the strips 26, 27.

Strengthening or supporting the end posts is not sufficient, however, as it would transfer the weakest point of the car end to the point of connection of the end post to the end plate. Accordingly I provide reinforcement for the end plate in the form of a strip 32 extending across the fascia 23, to which strip the vertical strips 26 and 27 are connected by means of bolts 34.

It will be observed that the belt rail 12 is cut away to receive the end post 18 and is weakened accordingly so that it is ill-adapted to carry the strain. The lateral overlapping of the end post by the vertical strengthening strips 26 and 27 provides support for the belt rail on either side of each end post. In order, however, to still further support the belt rail I have provided a horizontal strengthening strip 24 opposite the belt rail externally of the car.

The strips 26, 27, 32 and 24 provide support for the end posts the sheathing adjacent thereto the end plate and the belt rail but do not provide means for strengthening the connection between the car end as a whole and the side walls of the car. For this purpose the horizontal strengthening strips 32 and 24 are provided with right angle extensions 41 and 42 respectively secured to the side plate and side belt rail respectively by means of bolts 33 and 25.

Figure 3:
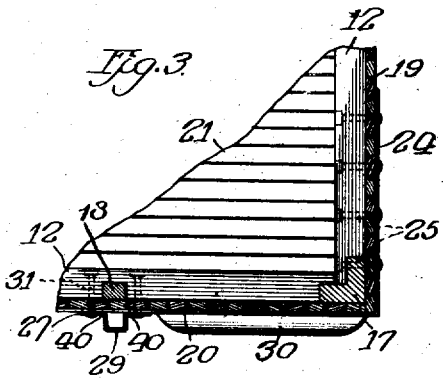
Fig. 3 is an enlarged detail, being substantially a section taken on line 3—3 of Fig. 1.

At the points where the strips 26—27 extend across the horizontally-extending strip 24, said strips 26—27 are off-set outward so as to fit snugly against said strip and against the end of the car. The strip 24 is provided with strengthening ribs or corrugations 30 having tapered ends and extending between the strips 26—27 and from said strips 26—27 toward the ends of the strip 24. The strips 26—27 are secured to the strip 24 and to the end of the car by means of bolts 31, which, in the construction shown, pass through the belt rail 12 as shown in Fig. 3 and consequently there are no holes in the end posts to weaken them.

The ends of the strip 32 are turned forward along the sides of the car where it is secured in position by bolts 33 passing through the side plates 13. At the points where the strip 32 extends across the upper ends of the strips 26—27 the strip 32 is offset to fit snugly about said ends and against the fascia 23. The strip 32 has pressed therein longitudinally thereof a strengthening rib or corrugation 35 by which the strip is given the maximum longitudinal strength. As will be seen from an inspection of Fig. 1, at the points where the strips 26—27 are offset about the strip 24 and at the points where the strip 32 is offset about the strips 26—27, the offset, in the construction shown, is pressed in the bearing faces only of such strips, leaving the outer edges of the strengthening ribs smooth and uniform.

By the use of a plurality of strengthening strips as shown provided with strengthening ribs pressed therein, with such strips firmly secured in place by pins or bolts passing through the end and side plates, the belt rail, and the side and end sills, respectively, a very strong construction is obtained capable of withstanding exceedingly heavy stresses without undue wear and tear upon the structure, the strengthening ribs being so disposed as to prevent under normal conditions of use any undue bulging outward or other straining of the ends of the car.

Having thus described my invention and illustrated its use, what I claim as new and desire to secure by Letters Patent is:—

1. In a device for strengthening the end of a car, the combination of a metal strip secured across the outer face of the car end and provided with a strengthening rib pressed in the strip longitudinally thereof, and a second metal strip secured across the outer face of the car end at an angle to said first-named strip and extending under the said first-named strip and under the strengthening rib thereof, said second strip being provided with strengthening ribs pressed therein longitudinally of said strip at opposite sides of its point of contact with said first-named strip.

2. In a device for strengthening the end of a car, the combination of a metal strip secured across the outer face of the car end and provided with a strengthening rib pressed in the strip longitudinally thereof, and a second metal strip secured across the outer face of the car end at an angle to said first-named strip and extending under the said first-named strip and under the strengthening rib thereof, said second strip being provided with strengthening ribs pressed therein longitudinally of said strip at opposite sides of its point of contact with said first-named strip, and said first-named strip having an offset pressed in the bearing face thereof to fit snugly over said second strip.

3. In a device for strengthening the end of a car, the combination of a metal strip secured in a horizontal position across the end of the car, and another metal strip secured in vertical position across the outer face of the car end and across said horizontally-extending strip, said second-named strip being provided with a vertically-extending strengthening rib pressed therein, and said first-named strip being provided with horizontally-extending strengthening ribs pressed therein at opposite sides of said second-named strip, and means for securing said strips together at their crossing point independently of the said ribs.

4. In a device for strengthening the end of a car, the combination of a metal strip secured across the outer face of the car end, and a plurality of other metal strips each secured across the outer face of the car end and the outer face of said first-named strip and each provided with a strengthening rib pressed therein longitudinally of the strip across said first-named strip, said first-named strip being provided with strengthening ribs pressed therein longitudinally of the strip both between said second-named strips and also from said second-named strips toward the ends of the first-named strip.

5. In a device for strengthening the end of a car, the combination of a metal strip secured in horizontal position across the end of the car, another metal strip secured in vertical position across the outer face of the car end and across said horizontally-extending strip, and a third metal strip secured across the upper portion of said car end and across the upper end of said second-named strip, said third-named strip being provided with a strengthening rib pressed therein extending across said second-named strip, said second-named strip being provided with a strengthening rib pressed therein extending across said first-named strip, and said first-named strip being provided with strengthening ribs pressed therein at opposite sides of said second-named strip.

6. In a device for strengthening the end of a car, the combination of a metal strip secured in horizontal position across the end of the car and having its ends turned and extended forward along the sides of the car opposite the belt rail, another metal strip secured in vertical position across the outer face of the car end and across said horizontally-extending strip, a third metal strip secured across the upper portion of said car end and across the upper end of said second-named strip, said third-named strip having its ends turned and extending forward along the sides opposite the side plates of the car, and means for securing said several metal strips together at the points where they cross each other.

7. In a device for strengthening the end of a car, the combination of a metal strip secured in horizontal position across the end of the car and having its ends turned and extended forward along the sides of the car opposite the belt rail, another metal strip secured in vertical position across the outer face of the car end and across said horizontally-extending strip, a third metal strip secured across the upper portion of said car end and across the upper end of said second-named strip, said third-named strip having its ends turned and extending forward along the sides opposite the side plates of the car, and means for securing said several metal strips together at the points where they cross each other, each of said metal strips being provided with longitudinally-extending strengthening ribs pressed therein for substantially its full length across the end of the car except that at the point where one of said strips crosses under another strip the strengthening rib of the under strip is faded out.

8. In a device for strengthening the end of a car, the combination of a metal strip secured in horizontal position across the end of the car and having its ends turned and extended forward along the sides of the car opposite the belt rail, another metal strip secured in vertical position across the outer face of the car end and across said horizontally-extending strip, a third metal strip secured across the upper portion of said car end and across the upper end of said second-named strip, said third-named strip having its ends turned and extending forward along the sides opposite the side plates of the car, means for securing said several metal strips together at the points where they cross each other, means for securing the forwardly-extending ends of said first-named strip to the belt rail, and means for securing the forwardly-extending ends of said third strip to the side plates of the car.

9. In a car construction, the combination with wooden end posts, corner posts, end plate, side plate and belt rail members, of a substantially vertical strengthening member arranged externally of and opposite to one of said end post members, said strengthening member being provided with flanges overlapping part of said belt rail on each side of said end post, and means for securing said strengthening member to said belt rail.

10. In a car construction, the combination with wooden end posts, corner posts, end plate, side plate and belt rail members, of a substantially vertical strengthening member arranged externally of and opposite to one of said end post members, said strengthening member being provided with flanges overlapping part of said belt rail on each side of said end posts, means for securing said strengthening member to said end plate, and means for securing said strengthening member to said belt rail.

11. In a car construction, the combination with wooden end posts, corner posts, end plate, side plate and belt rail members, of a substantially vertical strengthening member arranged externally of and opposite to one of said end post members, said strengthening member being provided with flanges overlapping part of said belt rail on each side of said end posts, means for securing said strengthening member to said end plate, means for connecting said end plate to said side plate, and means for securing said strengthening member to said belt rail.

12. In a car end construction, the combination with an end post and sheathing, of a substantially vertical strengthening member externally arranged opposite to and overlapping said end post laterally in both directions substantially throughout its length whereby the sheathing on each side of said end post is supported by said member.

13. In a car end construction, the combination with an end post and sheathing, of a substantially vertical strengthening member externally arranged opposite to and overlapping said end post laterally in both directions, and a rib on said member of less width than said end post, whereby both the sheathing on each side of the end post and the end post itself are supported by said member.

14. In a car end construction, the combination with an end post of a substantially vertical strengthening member arranged externally of the car opposite to and overlapping said end post laterally, and means for clamping said end post and member together, said means being externally arranged with respect to said end post.

15. In a car end construction, the combination with an end post and sheathing, of a substantially vertical strengthening member externally arranged opposite to and overlapping said end post laterally in both directions substantially throughout its length whereby the sheathing on each side of said end post is supported by said member.

16. In a car end construction, the combination with an end post and sheathing, of a substantially vertical strengthening member externally arranged opposite to and overlapping said end post laterally in both directions and a rib on said member of less width than said end post, whereby both the sheathing on each side of the end post and said end post itself are supported by said member.

17. In a car end construction, the combination with an end post, of a substantially vertical strengthening member arranged externally of the car opposite to and overlapping said end post laterally, and means for clamping said end post and strengthening member together, said means being externally arranged with respect to said end post.

18. In a car end construction, the combination with an end post and sheathing, of a substantially vertical strengthening member externally arranged opposite to and overlapping said end post laterally in both directions and also overlapping the sheathing, and means for clamping said end post, sheathing and strengthening member together and thereby the sheathing and the end post itself are supported by said strengthening member.

19. In a car end construction, the combination with an end post and sheathing, of a substantially vertical strengthening member externally arranged opposite to and overlapping said end post laterally in both directions and also overlapping the sheathing, and means for clamping said end post, sheathing and strengthening member together, said means being externally arranged with respect to said end post.

20. In a car end construction, the combination with wooden end post, corner post and end plate members, of substantially vertical strengthening members externally arranged opposite to and overlapping said end posts laterally.

21. In a car end construction, the combination with wooden end post, corner post and end plate members, of strengthening members of greater width than said end posts arranged diametrically opposite thereto on the opposite side of the sheathing of the car.

22. In a car end construction, the combination with wooden end post, corner post and end plate members, a substantially vertical strengthening member of greater width than said end post and of channeled cross-section opposite said end post.

23. In a car end construction, in combination with end post, end sill and end plate members, a substantially vertical strengthening member of greater width than said end post and of channeled cross section, the total cross section of the strengthening member being substantially constant throughout.

24. In a car end construction, the combination with wooden end and corner posts, end plate and side plates, of external metallic reinforcing members connected to said end posts, end plate and side plates respectively, and means for connecting adjacent reinforcing members together.

25. In a car construction, the combination with a wooden end post, of a substantially vertical strengthening member of greater width than said end post and externally arranged outside said post, said member having a substantially centrally arranged channeled portion of less width than said end post.

26. In a car construction, the combination with a wooden end post, of a substantially vertical strengthening member externally arranged outside said post, said member having a substantially centrally arranged channeled portion of less width than said end post, and lateral flanges projecting laterally beyond the sides of said end post.

27. In a car end construction, the combination with wooden end and corner posts, end plate, end sill and side plates, of an external horizontal metallic reinforcing member opposite the end plate, and a vertical metallic reinforcing member opposite an end post connected to said end plate, end sill and horizontal member, and means for connecting said horizontal member to said side plates.

In witness whereof I have hereunto signed my name in the presence of the two subscribing witnesses.

THOMAS N. RUSSELL.

Witnesses:
DONALD C. WILLIAMS,
RIDSDALE ELLIS.